United States Patent [19]

Rinio et al.

[11] 4,193,311

[45] Mar. 18, 1980

[54] DRIVING PULLEY MECHANISM

[75] Inventors: Johannes A. Rinio, Versailles, France; Rodolphe F. Tanson, Moutfort, Luxembourg

[73] Assignee: Greifzug Gesellschaft fur Hebezeugbau m.b.H., Bergisch-Gladbach, Fed. Rep. of Germany

[21] Appl. No.: 675,876

[22] Filed: Apr. 12, 1976

[30] Foreign Application Priority Data

May 17, 1975 [DE] Fed. Rep. of Germany ....... 2522033

[51] Int. Cl.² ........................ F16H 55/36; F16H 55/46

[52] U.S. Cl. ................................ 74/230.5; 74/230.24; 254/191

[58] Field of Search .......................... 74/230.24, 230.5; 254/191

[56] References Cited

U.S. PATENT DOCUMENTS

| | | | |
|---|---|---|---|
| 540,158 | 5/1895 | Fouts | 74/230.24 |
| 1,011,423 | 12/1911 | Gale, Sr. | 187/20 |
| 2,491,464 | 12/1949 | Hazen | 74/230.24 |
| 2,658,399 | 11/1953 | Mercier | 74/230.17 M |
| 3,195,364 | 7/1965 | Pauli | 74/230.24 X |
| 3,965,767 | 6/1976 | Rinio | 74/230.24 |

FOREIGN PATENT DOCUMENTS

| | | | |
|---|---|---|---|
| 747772 | 4/1933 | France | 74/230.24 |

*Primary Examiner*—Irwin C. Cohen
*Attorney, Agent, or Firm*—John J. Dennemeyer

[57] ABSTRACT

A driving pulley mechanism comprises at least one driving pulley consisting of two parts which are provided each with one part of a cable groove having a relatively great capacity of output transmission and are pressed toward each other by pressing devices.

Each pressing device comprises a spiral spring or consists of a single or multiple leaf spring and is coupled for rotation with the driving pulley parts, on both of which it rests directly or indirectly.

The driving pulley may cooperate with another (identical or conventional) driving pulley which rotates at the same speed e.g. by means of two gears mounted on the peripheral edges of the driving pulleys.

6 Claims, 12 Drawing Figures

FIG. 7
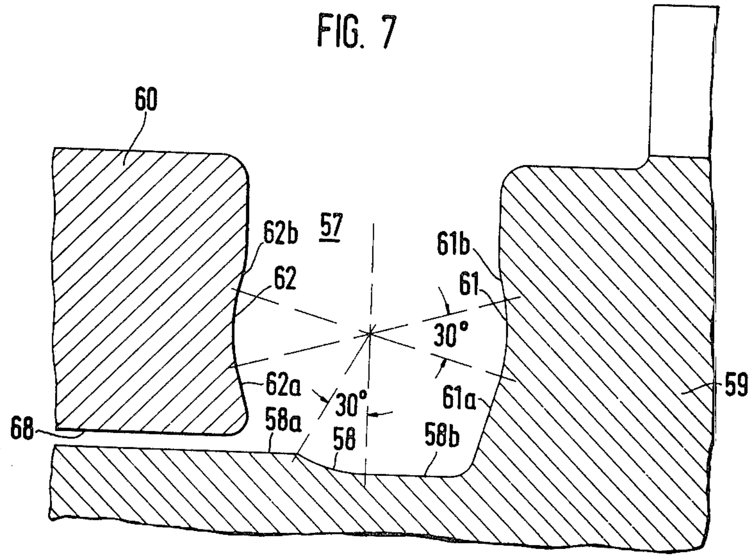
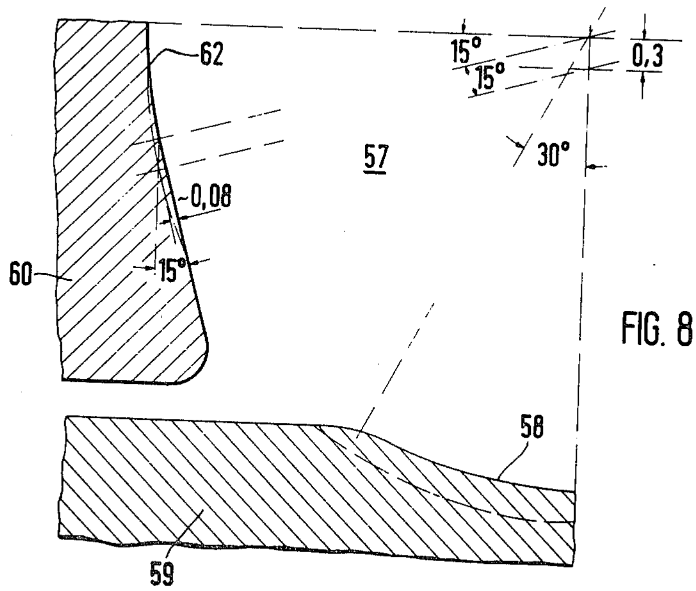
FIG. 8

DRIVING PULLEY MECHANISM

The invention relates to a driving pulley mechanism comprising a driving pulley, which may be used particularly as a multiple purpose hoist with a traversing cable wherein the driving pulley consists of two pulley parts inclined toward each other, each of which is provided at its peripheral edge with a cable groove part, and wherein the pulley parts are pressed toward each other at the apex of their peripheral edge which carries the cable and wherein several elastical pressing devices are arranged in spaced relationship on the surface of the pulley parts in proximity of the peripheral edge of the pulley parts, and wherein the pulley parts are pressed away from each other at at least one point opposite to the apex carrying the cable by a spreading device.

The present invention is an improvement upon the invention shown in U.S. Pat. No. 3,965,767 which was copending with this application, and which is referred to herein as the main patent, one of the inventors in this application being the inventor in said patent.

A driving pulley mechanism according to said main patent may always be used advantageously, in the case of an application as a multiple purpose hoist with a traversing cable, in place of a driving mechanism working under the same condiditions and having a conventional cable pulley and more particularly when the cable load is a one-sided one and in general when the cable is not tensioned at one or at both sides because it can frequently happen that the contact friction between the cable and the pulley is not sufficient to transmit the rotating moment exerted on the latter.

Nevertheless the rotating moment transmitted by such a driving mechanism is greater than usual due to the utilization of pressure exerting devices, but it is reduced by various friction forces which are not unavoidable in the transmission of the nominal moment. These friction losses and the corresponding wear of both the cable and the driving pulley originate primarily from the following causes:

(a) the winding angle of the cable on the driving pulley is only 180° and consequently the specific pressure which is generated by the cable load on the cable groove surface is relatively high, and is even greater when the cable is loaded at only one side. Accordingly the wear is substantial;

(b) as the value of the cable pull, due to its small winding angle, especially in case of unilateral load, is relatively high, another disadvantage becomes more important, one which is actually present in all conventional cable pulleys including those having a wedge groove, which is caused by the very different pull stress of the cable on its travel over the pulley, namely the variability of the rope elongation in its successive sections, the thereby created (small) climbing of the cable in the groove (cable creep) and the corresponding mutual wear.

(c) in order to enable the driving pulley to transmit the required rotating moment produced by the motor pressing rollers are utilized and the strong pressing force which they exert on the pulley parts allows the development of substantial contact friction resistance forces in the pressing roller bearings;

(d) the winding arc is relatively unfavorable due to the fact that the friction losses, unavoidable, which are produced by the deformation of the cable when winding and unwinding and by the mutual friction of the cable wires, must be related to an arc value of only $2\pi$;

(e) the driving pulleys are relatively expensive and therefore their life, which is prejudiced by the wear, appears even shorter.

It is an object of the invention to substantially reduce or eliminate the mentioned disadvantages and thereby assure simultaneously a higher output transmission and a longer life of the driving pulley mechanism, the subject matter of said main patent. For this purpose the invention provides:

(a) a functional designing of the lower part of the cable groove of the driving pulley according to the invention in such a way that the rotating moment transfer becomes substantially higher than in the case of conventional groove forms;

(b) a functional designing of the upper part of the cable groove of the driving pulley according to the invention in such a way that the "cable creep" on the groove surface and its disadvantages are at least reduced;

(c) the application of such pressing devices that the pressure on the pulley parts is derived from a mutual effect of the pulley parts themselves;

(d) the utilization of a material being friction resistant and having a high coefficient of friction which is applied on the flanks and, if appropriate, on the bottom of the groove. Such a construction presents simultaneously the advantage that it is no longer necessary to replace one or more driving pulleys which have become unusable due to the unavoidable although thus reduced wear: it is sufficient to line the groove of the particular driving pulleys at a relatively small cost.

The life of the driving pulleys and of the driving pulley mechanism becomes almost unlimited.

(e) the cooperation of a driving pulley according to the above-identified main patent and of a conventional (preferably provided with a wedge groove) driving pulley, or of two driving pulleys constituted according to said main patent, which rotate in opposite directions and at the same speed, wherein e.g. both driving pulleys have two gear rings at their peripheral edges, which are in engagement or are driven together (directly resp. over a pinion) by a pinion which is mounted on the driving shaft and wherein the cable extends in a normal way or in the form of an 'S' (straight or reverse);

(f) alternatively the cooperation of two driving pulleys having one or more grooves, of which at least one is constituted according to said main patent and which rotate in the same direction and with the same speed (e.g. by pinion drive) wherein the cable travels from one driving pulley into the other in a straight manner (without reverse-bend). Additional advantages and features of the present invention will be explained hereafter in greater detail with reference to the accompanying drawings which illustrate various embodiments of the invention.

In the drawings:

FIG. 7 shows a combined cable groove profile according to the invention utilized in the driving pulleys according to FIG. 6;

FIG. 8 shows a comparative representation of the side and bottom wear of the cable groove illustrated in FIG. 7;

Figure 1:
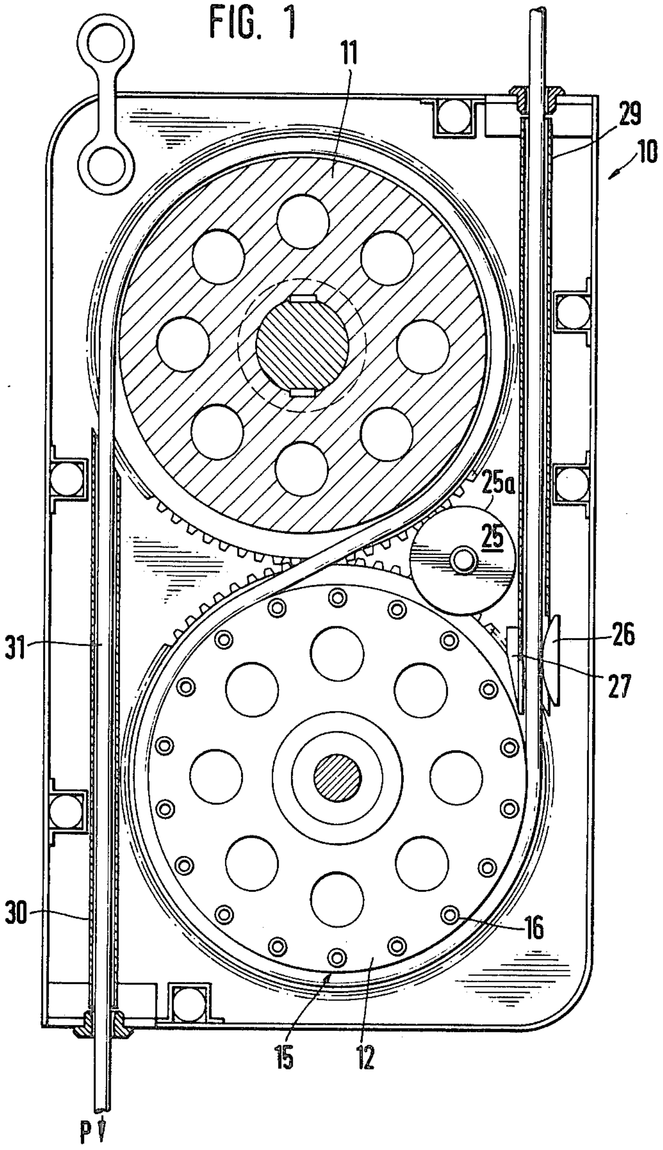
FIG. 1 shows the combination of a first driving pulley according to the invention presenting a cable groove with a square profile, the second ring shaped pulley part being removed, and of a conventional pulley with a wedge groove, in cross section.
Figure 2:
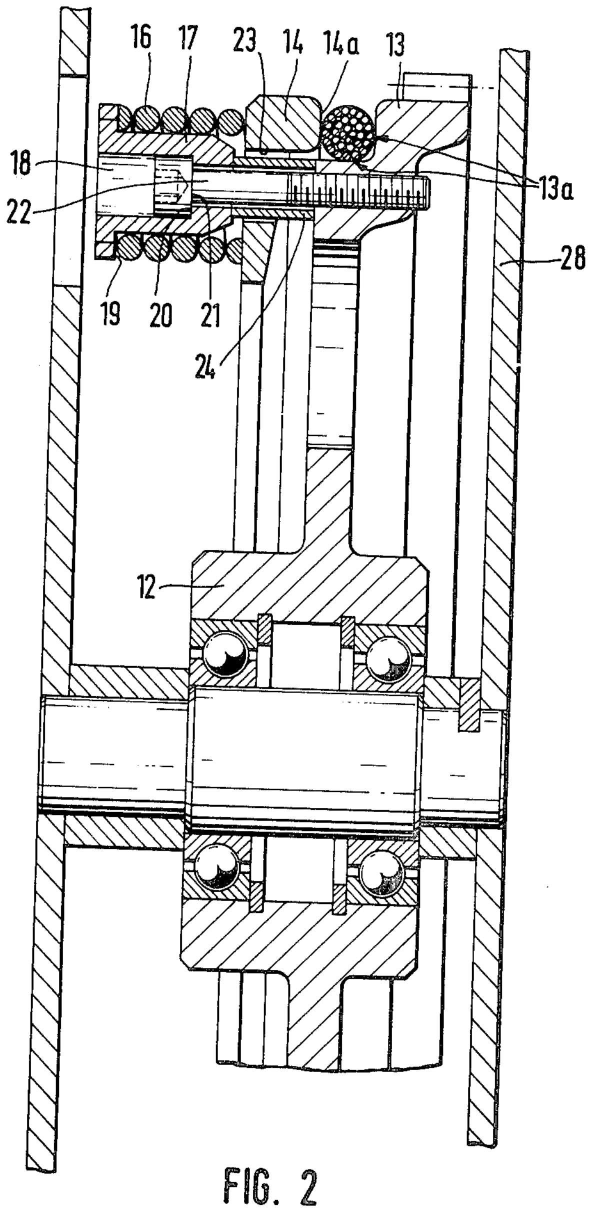
FIG. 2 shows a first pressing device with a spiral spring utilized in the driving pulley of FIG. 1, in cross section.

The driving pulley mechanism 10 illustrated in FIGS. 1 and 2 consists of two driving pulleys 11 and 12 enclosed in a housing, the first driving pulley being provided with a conventional groove, of trapezoidal shape, while the second pulley is formed according to the invention and is composed of a first pulley part 13 carried by a shaft journalled on the housing and of a second ring shaped pulley part 14 which is carried by the first one and which is taken along in its rotating movement.

The driving shaft of the driving pulley mechanism is keyed for rotation with the first driving pulley 11 (and rotatable relative to the housing), while the first pulley part of the second driving pulley 12 is journalled for rotation on a shaft fixed to the housing, e.g. by roller bearings. The two pulleys are coupled together by two gear rings which are mounted at the respective peripheral edges and in engagement with each other. Thus this pulley 12 can also be driven from the driving shaft over the driving pulley 11 and cooperate with it for the transmission of rotating moment.

The pulley parts of the second driving pulley 12 are provided each with a part of the cable groove. A first groove part 13*a* arranged on the pulley part 13 is composed of a ring shaped surface perpendicular to the pulley axis and of an also ring shaped surface which is parallel to the pulley axis, while the other groove part 14*a* located on the pulley part 14 consists merely of a ring shaped surface perpendicular to the pulley axis.

The ring shaped pulley part 14 carried by the pulley part 13 is pressed toward it by several pressing devices which are distributed uniformly over the peripheral edge, each pressing device including a spiral spring 16. Each spring 16 is wound around a retaining bush 17 which presents an offset bore 18 and rests on the inner surface of its end flange 19 while the sleeve itself with its bore shoulder 20 is placed on the inner surface 21 of the head of a screw 22 passing through the bush, this screw traversing a bore 23 of the ring shaped pulley part 14 and being screwed into a threaded bore of the pulley part 13 just below the cable groove 13*a*, 14*a*. A spacer sleeve 24, which is lodged in the bore of the pulley part 14 with a small radial clearance, maintains the pulley part 14 at a small distance from the retaining bush 17 and allows the retaining bush to be fastened by a screw 22 to the first pulley part 13.

At the point located opposite the center of the winding arc of the cable a spreading roller 25 similar to the guide roller 37 of said main patent inserts its projecting peripheral ring 25*a* between the two cable groove surfaces that are perpendicular to the pulley axis, and its purpose is to maintain the pulley parts 13 and 14 at a predetermined distance from each other in such a way that the cable may freely wind into and off the groove.

In the vicinity of the geometrically predetermined wind-off of the cable from the second driving pulley two guide elements 26 and 27 are arranged which are adjustable transversely of the cable. They oppose the effect of cable rigidity which consists of the elastic rigidity and the friction rigidity, as is well known. During the wind-off the cable would deviate outwards due to the elasticity of the wires tending to return to their original form and inwards due to the mutual friction of the wires. However, because of the varying properties of the different cable types it cannot be ascertained whether the elastic forces or the friction forces are prevailing, and it can also not be determined precisely at which point the cable lifts off the bottom portion of the cable groove. In any case, regardless of whether the cable attempts to twin inwards or outwards, one or the other guide element will oppose it.

At the housing 28 a guide tube 29 is mounted which guides the cable until it leaves the driving pulley mechanism and avoids thus that owing to a mutual contact between the cable and a driving pulley one and/or the other can be damaged. A similar tube 30 for the same purpose is situated between the inlet of the cable into the driving pulley mechanism and its winding onto the first driving pulley 11.

In this embodiment it may happen that in consequence of an irregular wear of the cable surface the second pulley part is slightly turned and/or radially displaced and thus comes into contact with the spacer sleeve 24. The friction thus caused can cancel the effect of the pressing devices partly or entirely and the driving capacity of the driving pulley is thereby reduced by the contact friction associated according to the invention with the groove sides.

Figure 4:
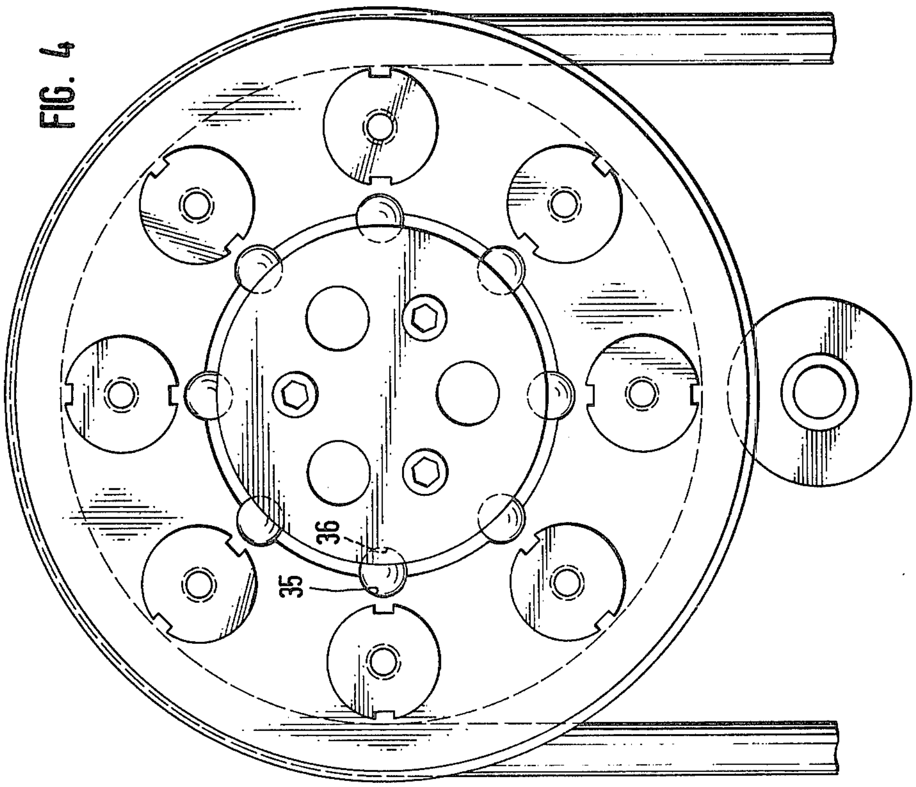
FIG. 4 is a front view of the same driving pulley shown in FIG. 3.
Figure 3:
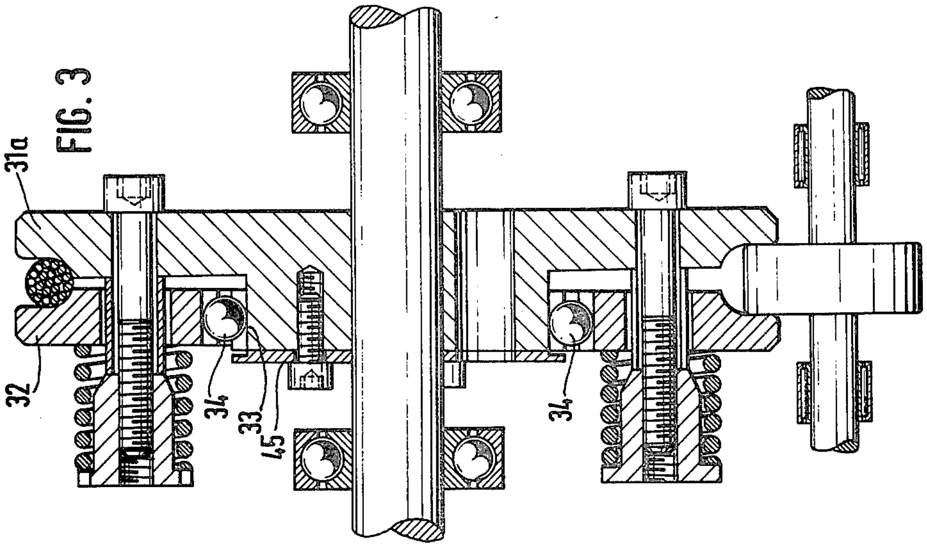
FIG. 3 shows a second driving pulley according to the invention with an undercut cable groove, in cross section.

A second embodiment of the invention illustrated in FIGS. 3 and 4 eliminates this disadvantage in that the second pulley part 32 is not maintained in the position which is most suitable for the transmission of the moment merely by radially symmetrical components of the friction forces generated on the cable surface, as in the first embodiment, but primarily in that the second pulley part 32 is carried by a projection 33 of the first pulley part 31 which extends parallel to the pulley axis. In order to assure a perfect effect of the pressing devices balls 34 are also provided which are lodged in cylindrical grooves 35, 36 coaxial with the first pulley part, pertaining to the one and the other pulley part and disposed oppositely in pairs, whereby the second pulley part 32 may move axially almost without friction. Furthermore an escape of the balls 34 is prevented by a disk 45 fixed to the first pulley part 31.

Figure 5:
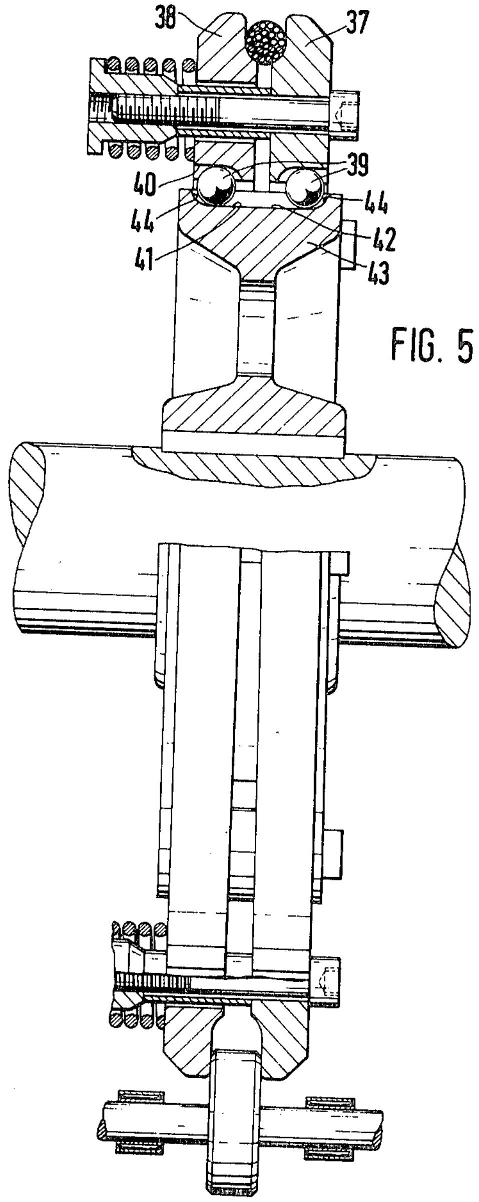
FIG. 5 shows a third driving pulley according to the invention, also with an undercut cable groove, in cross section.

In case the unilateral inclination of the second pulley part 32 toward a radial plane should be undesirable, as well as the fact that because of the lateral position of the balls 34 relative to the cable plane disadvantageous moments are created during the power transmission, one can provide in a third embodiment of the invention shown in FIG. 5 two symmetrical pulley parts 37, 38 also mounted each on one row of balls 39 wherein the corresponding balls 39 are able to roll axially in pairs in oppositely disposed grooves 40, 41, which are uniformly distributed on the inner edge of each pulley part 37, 38 respectively on the peripheral edge 42 of a third pulley part 43. In this arrangement the grooves 40 present on the oppositely disposed ends and the groove 41 at both ends a spherical abutment surface 44 whereby an escape of the balls 39 is prevented. As may be seen from this Figure, it is thus obtained that, for symmetrical reasons alone, the two pulley parts 37, 38, in consequence of the spring pressure and as a function of the cable diameter and of the width of the peripheral ring 25*a* of the spreading roller 25, take an equal inclination toward the median plane of the pulley so that the generated moments will neutralize each other mutually.

The arrangement of the driving pulley of a driving pulley mechanism in the embodiment illustrated in the FIG. 1 is not arbitrary: the loaded cable 31 must first wind onto the pulley 11 with a trapezoidal groove because all driving capacity of this pulley is lost when it is arranged in second place. In fact such a driving mechanism can only be used when the cable winding onto or off the pulley with a trapezoidal groove is loaded, that is when the load is applied parallel to the arrow 'P' and in the same direction. A load (but not too small) may be lifted or lowered, but the cable cannot travel back unloaded.

Moreover, depending on its original thickness and on the cable pull corresponding to the load, the cable penetrates into the trapezoidal groove of the pulley 11 to a greater or lesser extent and thus originates in practically all cases a difference between the indefinite diameter of the cable during its course along the same pulley 11 and its definite diameter on the driving pulley 12 according to the invention. This again causes operational disturbances: when the diameter of the cable course line in the trapezoidal groove is sufficiently smaller than its diameter on the driving pulley 12 the cable is subjected, specially while passing from the first to the second driving pulley, to an inadmissible high tensile strain, and when, to the contrary, the cable course diameter is larger than on the driving pulley 12, the cable is pushed back into the trapezoidal groove with such a force that it tries to climb up on its flanks to the extent that the reduced contact friction lets it slide.

A fourth embodiment of the invention illustrated in FIGS. 6 through 10 removes also these disadvantages and realizes furthermore to a higher degree the advantages of the invention. The driving pulley mechanism consists of two driving pulleys 51, 52 designed according to the invention and provided each with a spreading roller 53 or 54 and a pair of guide elements 55*a*, 55*b* resp. 56*a*, 56*b*.

In this case a unilateral cable pull can be directed either according to arrow X or arrow Y: the driving pulley arranged in the first resp. second instance in second place has its own driving capacity independent of the cable pull and cooperates in both load conditions with the other driving pulley for the transmission of turning moment. In consequence of this driving capacity which is proper to the driving pulley according to the invention a driving pulley mechanism according to the fourth embodiment is able not only to lift or lower a load whether in the embodiment of FIG. 6 or in a reverse arrangement, not only to produce the unloaded return travel of a vertical cable or of a cable inclined at any desired angle, but to move a load even horizontally along an untensioned cable in the one or the other direction.

The cable groove 57 of the fourth embodiment illustrated in FIGS. 7 and 8 presents a form which is composed of sections of the three most commonly used groove forms, namely of those which have the greatest driving capacity by the lowest wear, wherein the driving capacity is proportional to a contact friction value $\mu$ and thus, over a form coefficient $K_f$, to the coefficient of friction $\mu_o$.

It should be useful to recall the following:

a cable groove with a square profile has the smallest contact friction value $\mu$, which corresponds only to the material of the friction surface and its condition. For wire cables on cast iron it can be $\mu \cong 0.09$. In this case the cable suffers a great deal in that its lower portion is pressed flat on the groove bottom, and the wear of the cable groove is also considerable because to the normal force concentrated on a very narrow strip corresponds a high specific pressure;

a half round groove adapts best to the cable surface and has a somewhat larger contact friction value, although by far not the largest, e.g. $\mu = 0.15$. The wear can be considered as average and is distributed, as the corresponding specific pressure, approximately parabolic to the (half round) contact surface;

an undercut groove has a more favorable contact friction value (almost double than that of the half round groove) but in respect of wear it is even less favorable than the half round groove, because the contact pressure diagram, also parabolic, does not present a central portion which supports the cable with approximately normal forces, so that the specific pressure is greater;

the (trapezoidal) wedge groove possesses indeed the greatest driving capacity (2 to 4 times relative to the half round groove and 3 to 5 times relative to the square groove), but causes a rapid wear of the cable and the groove flanks whereby the contact friction value is reduced to a smaller value, comparable to that of the undercut groove;

also the above described groove form leaves something to be desired in regard to the driving capacity. The contact friction value is actually increased relative to that of the smooth groove, but only owing to the pressure according to this invention. The above mentioned cable groove 57 utilized in the fourth embodiment of the invention and illustrated in FIG. 7 is composed of the following sections:

The groove floor is carried by the first pulley part 59 and its cross-section consists of an arc shaped section 58 concentric with the cable which forms with the median plane of the pulley an angle of 30° facing the second pulley part and joins at the one side facing the second pulley part in an obtuse angle and at the other side tangentially to each a straight, axially directed section 58*a* or 58*b*;

the first and the second flank portions belong to the first resp. the second pulley part 59, 60 and correspond in cross-section to two oppositely disposed arc shaped sections 61, 62 or 30° also concentric with the cable and whose center lies on an axially directed diameter. These sections 61, 62 join tangentially downwards and upwards each to two straight sections 61*a*, 61*b*; 62*a*, 62*b* which form a 15° angle with the median plane of the pulley, the upper sections 61*b*, 62*b* merging over a rounded portion into two radially directed, outwards rounded off lines. The effect and the advantages of the individual groove sections are obvious. The cable 63 is carried primarily by the groove bottom 58 in the area of the arc shaped section and by the adjacent portion of the tangentially joined straight section 58*b*. In this way the contact pressure of the cable corresponding to the cable pull produces, on the one hand, on the arc shaped portion of the contact surface of the groove bottom contact friction forces which are distributed, as in the case of the half round groove, according to a parabolic diagram, but are contained only in its half central, most favorable portion, wherein the cable is not pressed flat as in the case of the square groove. On the other hand, the subsequent straight section does not resist the lateral, axially directed thrust transferred from the arc shaped groove section 62 of the second pulley part 60 and thus contact friction forces may develop in the two oppositely disposed arc shaped groove flank sections 61, 62 which, also distributed according to a parabolic diagram, are contained also in its central portion and thus offer the best protection for the contact surfaces.

Upon closer inspection of the process for the transmission of turning moment one can discern that the cable 63 takes on a slightly oval shape due to the cable pull, more and more as the cable pull increases, so that it exerts its pressure now on the lower half of the arc shaped section and on the contiguous inclined section of the sides. In this case a more favorable contact friction value $\mu=0.35$ (for wire cables on cast iron pulleys) corresponds to the total driving capacity of the bottom and of the flanks. Nevertheless this does not cause, as it is usually the case with wedge grooves, a substantial wear because the pressing effect and consequently the substantial deformation of the cable due to a high pressure is limited according to the invention: when the resultant of the axial components of the forces which are perpendicular to a groove flank exceeds the force of the springs it forces apart the two pulley parts 59, 60 to a sufficient extent that the lateral contact pressure of the cable 63 is again so reduced that it becomes equal to that of the spring forces.

This favorable effect of the lower inclined flank surfaces 61*a*, 62*b* remains even when a certain wear occurs, which is anyway very small with respect to that of normal grooves under similar conditions. As shown in the embodiment of FIG. 5, to a wear of the groove bottom of 0.3 mm corresponds a lateral wear of only 0.08 mm, so that the design of the groove and the limited wedge effect obtained according to the invention remain practically unchanged.

Owing to the form of the upper half 61*b*, 62*b* of the side sections the cable creep is also practically eliminated: a wandering of the cable can take place only in the extremely small space which has become vacant due to the change of the cable into an oval shape and the side surfaces 61, 61*b*, 62, 62*b* oppose a further creeping of the cable. Furthermore the cable 63 can enter the groove freely at the inlet point and leave it freely at the outlet point as the radially directed end surfaces of the cable groove are moved laterally by the spreading roll 53 provided there for that purpose.

Figure 9:
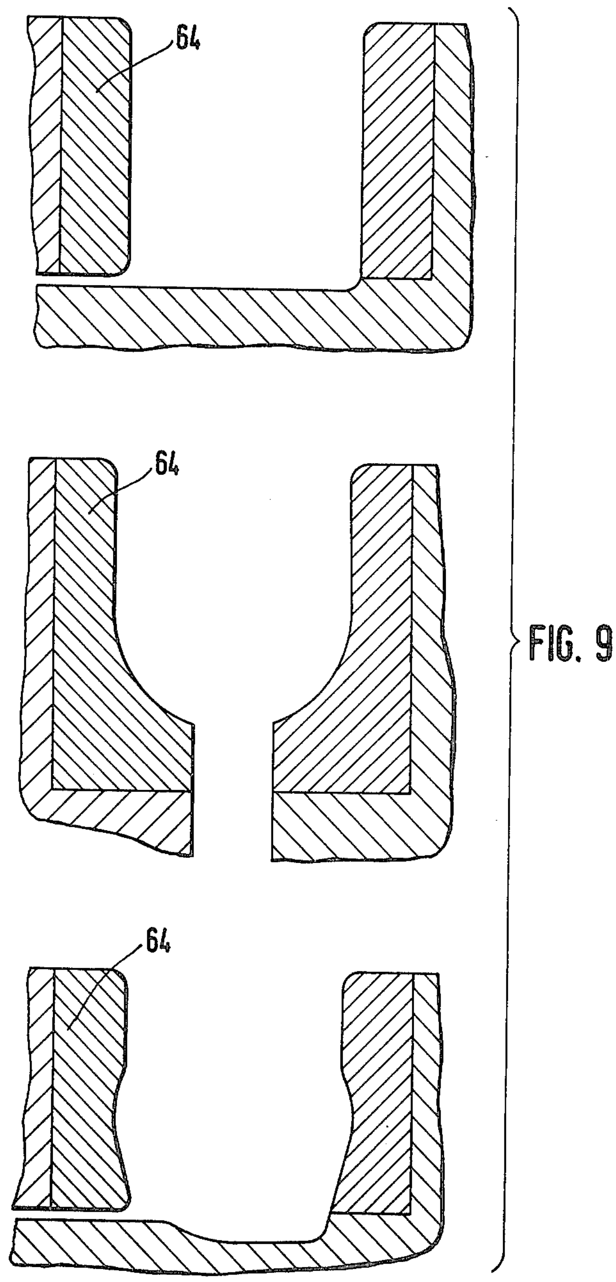
FIG. 9 shows a diagrammatic representation of the lining of a cable groove with a square or undercut or combined profile.

In FIG. 9 grooves according to the invention are shown which are coated with a material 64 being friction resistant and presenting a higher coefficient of friction.

Figure 6:
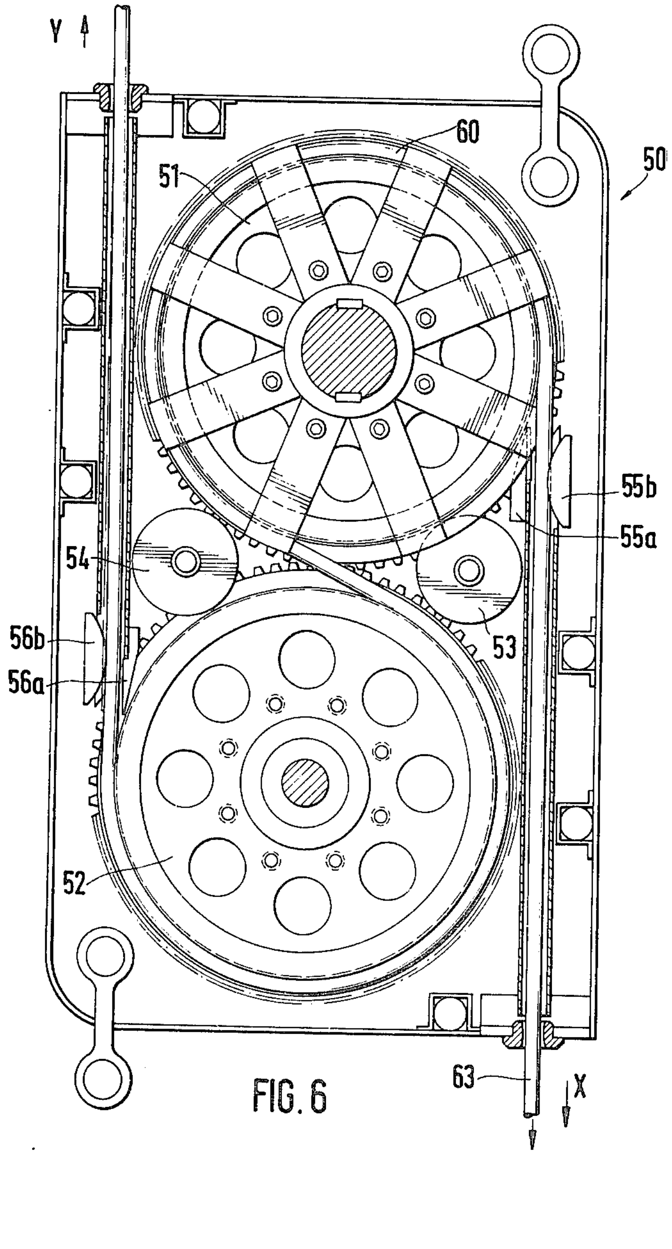
FIG. 6 shows a combination of two identical driving pulleys according to the invention in a fourth embodiment, with a combined cable groove profile, wherein on top is represented a front view and at the bottom an inside view of the same, with the second ring shaped pulley part removed.
Figure 10:
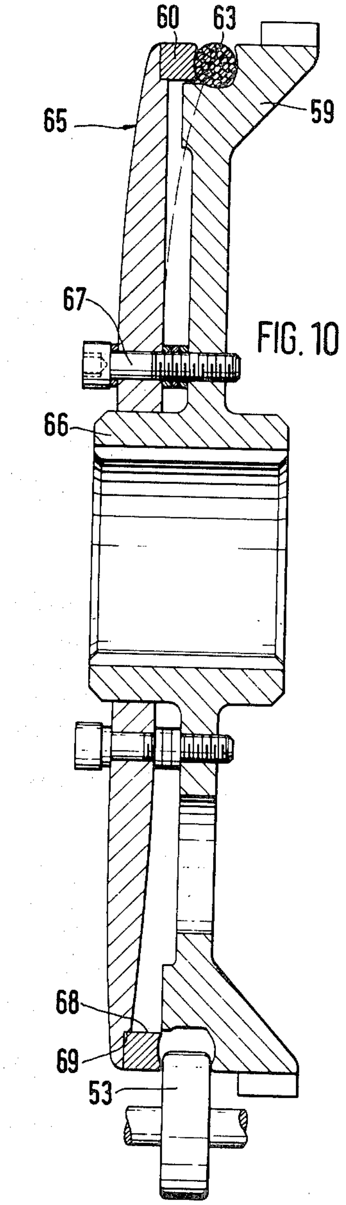
FIG. 10 shows a second pressing device with a leaf spring utilized with the driving pulley of FIG. 6, in cross section.

The pressure on the two pulley parts is also assured by a second embodiment of the pressing device according to the invention illustrated in FIGS. 6 and 10, which is composed of one or more contact pressing elements 65 mounted on the first pulley part 59, wherein each pressing element 65 consists of a leaf spring fixed by a screw above the hub 66 and consisting of one or more leaves. For reasons of weight the leaf spring shows a preferred form of constructions whose width is constant and whose profile is designed according to a cubic parabola.

This type of spring has a resistance which is constant along the spring in a known manner and produces thus the greatest force by the lowest weight. Moreover, manufacturing such a spring does not demand particularly much time because all the spring leaves necessary for one or more driving pulley mechanisms may be cut from a single prefabricated strip of spring steel. Each spring is originally arc-shaped and the radius of the arc is so chosen that the spring force distributed over the disk periphery is able to exert on the cable 63, when the springs are bent back straight, the predetermined pressure that is most suitable for operating the driving pulley mechanism. The pressing device in this second embodiment is remarkable because it exerts, similar to the first embodiment, the required pressure on the cable "from the inside" instead of "from the outside" in the above-identified main patent, by using, as proposed pressing rollers mounted in the housing, whereby the creation of any friction force reducing the transmitted moment (excepting the internal friction forces) remain excluded. Furthermore this embodiment presents the following advantages:

1. The force of each pressing element 65 may be adjusted over a very broad range, namely from 0 kg up to the yield point and the pressing device may thus be used with a cable, for which, depending on the type and diameter, a quite different pressure is admissible;

2. The force of each pressing element 65 can produce in the entire above mentioned range from 0 kg up to the yield point, through simple tightening or loosening of the retaining and adjusting screw 67, with greatest accuracy the required pressure, and this pressure remains constant as the pressing element 65 cannot be impeded in its effect by friction from any parts associated with the spring;

3. The space requirement of the housing is reduced substantially, e.g. by one third, due to the much smaller depth demanded by leaf springs in comparison with other types of springs, and as much easier to handle becomes the driving pulley mechanism, which is frequently determinant in the choice of one apparatus or another;

4. The weight of the driving pulley mechanism is also reduced in a substantial manner and not only by the fact that a leaf spring with uniform strength in relation to springs of a different type presents at equal force and equal (elastic) bending a smaller weight—because the material is, unlike that of the other springs, submitted to a uniform stress in the successive cross-sections lying transversely of the spring axis, and has not to resist any stress corresponding to a component of deformation lying in another plane that that of the bending but also because no accessories are necessary and because the housing, as indicated above, has a substantially smaller depth;

5. The cost of a contact pressing element in this form is substantially reduced (to a different range with reference to the cost of the pressing elements with other springs owing to the fact that it depends essentially on the leaf spring, thus with the exclusion (aside from the retaining and adjusting screw and the corresponding thread cut into the first pulley part 59) of any accessories and of any expensive assembly work;

6. Such a pressing element can be utilized, in consideration of its extremely broad adjusting range, not only, as mentioned above, in a particular driving pulley mechanism for cables of different type and of different thickness, but even in one or the other driving pulley mechanism, thus with different driving capacity. Consequently, in view of a probably larger mass production, the cost price can be further reduced and the storage expenses almost eliminated.

The second ring shaped pulley part 60 presents a substantially rectangular cross-section and is carried by the spring 65 which simultaneously urges it toward the cable 63 in the area which is opposite to the spreading roller 53. The side surface 68 of the ring 60 facing the shaft of the second pulley part 60, which rests on an abutment surface 69 located at the free end of the spring 65, is inclined toward the same shaft at a flat angle $\beta$, in such a way that this side surface 68, by a certain width of the spreading roller and an average value of the cable diameter parallel to the shaft of the first pulley part 59 and at a small distance from the groove floor 58 lying on its periphery. Consequently the groove flank 62 arranged perpendicularly to the same side surface 68 is substantially parallel to the median plane of the first pulley part 59 and inclined toward the median plane of the second pulley part 60 by the same angle $\beta$, whose value is to be determined by the formula $$\beta = \arc\sin(s - d_m/D)$$

wherein s designates the width of the spreading roller 53, $d_m$ is the average cable diameter and D the diameter corresponding to the contact point of the spreading roller 53 and of the second pulley part 60.

Figure 12:
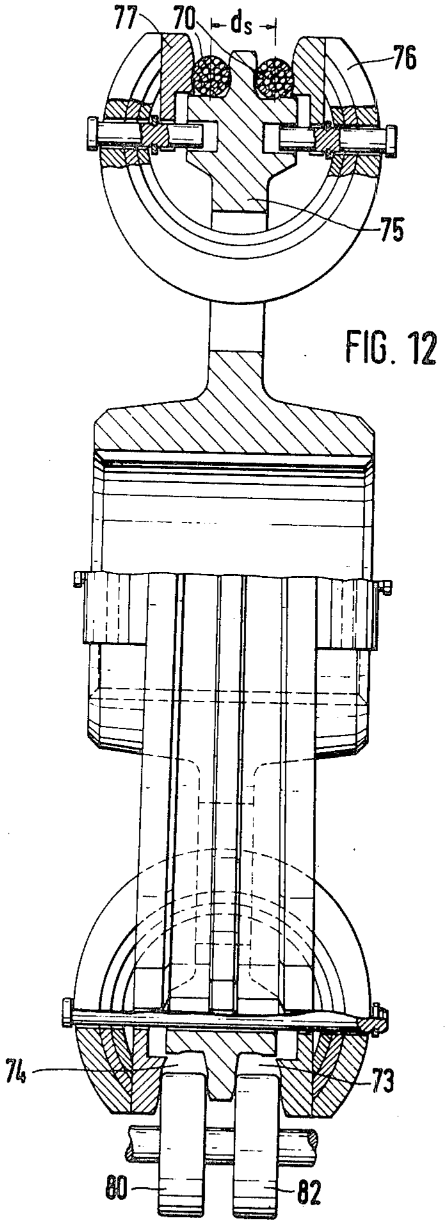
FIG. 12 shows a third pressing device with a curved leaf spring utilized in the driving pulleys of FIG. 11, in cross section.
Figure 11:
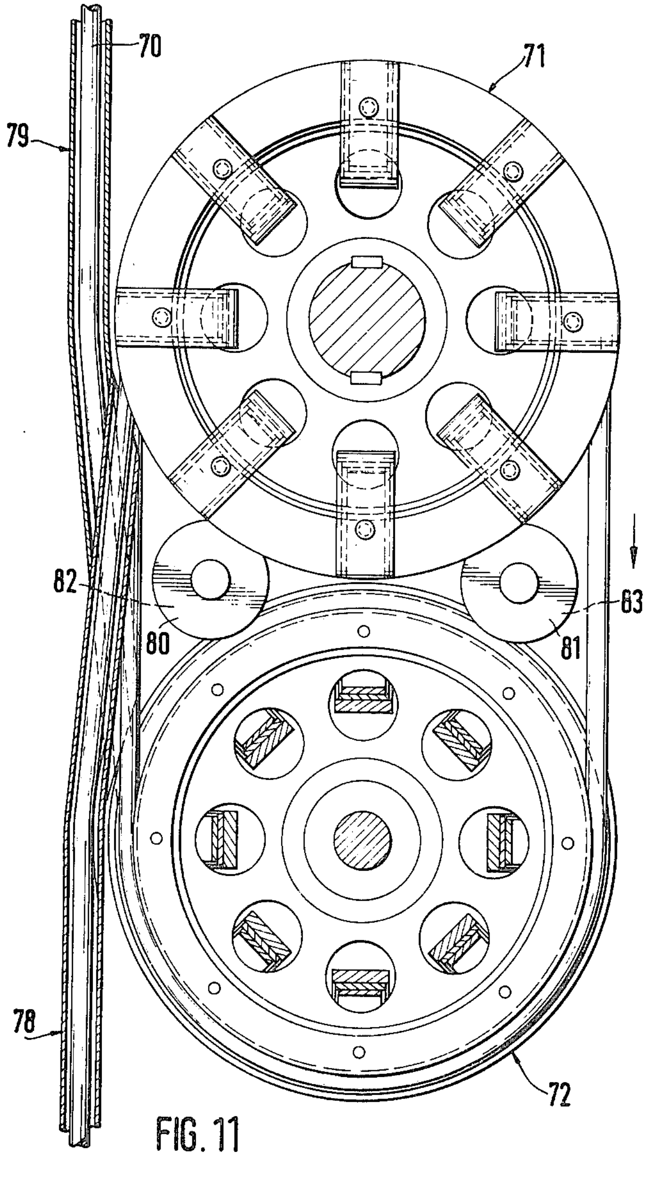
FIG. 11 shows a combination of two identical driving pulleys according to the invention in a fifth embodiment, also with a combined groove profile, also in a front and an inside view.

A fifth embodiment according to the invention illustrated in FIGS. 11 and 12 provides an even greater protection for the cable 70 and assures an even longer life of it in that it is not subjected to a reverse bend as in the 'S' type cable course. The driving pulley mechanism consists of two identical driving pulleys 71, 72, enclosed in a housing and provided each with two cable grooves 73, 74 according to the invention, and each driving pulley 71, 72 is composed of a first pulley part 75 keyed for rotation with a shaft journalled in the housing and of two ring shaped pulley parts 76, 77 which are carried by the former and are taken along in its rotating movement.

The median planes of the driving pulleys 71, 72 are inclined toward each other at an angle $\alpha$, in such a way that the straight line common to these two planes traverses the center points of two superimposed cross-sections of the cable grooves pertaining each to a driving disk. The value of the angle $\alpha$ is to be derived from the following formula:

$$\alpha = \arc\sin(d_s/D_s)$$

wherein $d_s$ is the axial distance of the center points of the cable groove parts, which lie adjacent each other on the first pulley part, and $D_s$ the driving pulley diameter corresponding to the center point of a cable groove. Accordingly the cable 70 may pass freely and without any lateral constraint from one driving pulley to the other and go twice around the driving pulley pair. Two pairs of guide elements may be fastened to the housing directly in front of the cable inlet into the first cable groove of the first driving pulley 71 and behind the cable outlet from the second cable groove of the second driving pulley 72. They are similar to the guide elements 55*a*, 55*b*; 56*a*, 56*b* of the fourth embodiment according to the invention shown in FIG. 6. Furthermore two slightly curved guide tubes 78, 79 which are adjustable transversely of the cable are provided at this inlet and outlet. The guide elements counteract the cable rigidity in the guide tubes lead the cable as shown in FIG. 11 past the driving pulley in such a way that the axes of the two cable ends coincide at the inlet and outlet from the housing.

As can be seen from FIGS. 11 and 12 the two driving pulleys 71, 72 are associated with two pairs of symmetrically mounted spreading rollers 80, 81; 82, 83 similar to the spreading rollers 53, 54 of the above mentioned FIG. 6.

The two driving pulley shafts protrude from the housing on the same side and on their extensions gear wheels are keyed which are driven in common by a pinion gear mounted on the driving shaft. Accordingly the two driving pulleys 71 and 72 rotate in the same direction and at the same speed and both cooperate in the transmission of the turning moment.

It is advisable to separate the gear wheels from the driving pulleys 71, 72 in a grease-tight housing so that they can be lubricated thoroughly without affecting thereby the adjacent driving pulleys 71, 72 in their driving capacity.

What is claimed is:

1. A driving pulley mechanism comprising a driving pulley, especially for multiple purpose hoists with a traversing cable, wherein the driving pulley consists of two pulley parts inclined toward each other, each of them carrying at their peripheral edge one cable groove part, and wherein the pulley parts are pressed toward each other at the apex of their peripheral edge which carries the cable, and wherein a plurality of elastical pressing devices are arranged in spaced relationship over the surface of the pulley parts in proximity of the peripheral edge of said pulley parts, and wherein the pulley parts are spread apart by a spreading device at least at one point opposite to the apex carrying the cable, the improvement consisting in that the cable groove part carried by the first pulley part presents one surface which is parallel to the pulley shaft and one surface which is perpendicular to the pulley shaft and fixed relative to said parallel surface, and wherein the cable groove part carried by the second pulley part presents one surface which is perpendicular to the pulley shaft; the second pulley part having a plurality of bores therethrough each bore associated with one of the plurality of elastical pressing devices, each of said elastical pressing devices defining a screw means extending through a bore in said second pulley part and secured to said first pulley part, a bushing and sleeve mounted on said screw means and rigidly connected thereby with said first pulley part, and spring means interposed between said bushing and said second pulley part for biasing said second pulley part against the cable.

2. Driving pulley mechanism according to claim 1, wherein at least the cable groove sides consist of a material which has a relatively high friction coefficient.

3. Driving pulley mechanism according to claim 1, wherein one of the pulley parts is ring shaped and is supported by the other pulley part, which is keyed to the pulley shaft, for movements of rotation and axial translation relative thereto.

4. Driving pulley mechanism according to claim 1, wherein the driving pulley cooperates with another driving pulley which rotates at the same speed as the first driving pulley.

5. Driving pulley mechanism according to claim 4, wherein the first and second driving pulleys are coupled for movement of rotation by means of two gears mounted on their peripheral edges whereby the gears engage each other or engage a pinion gear.

6. Driving pulley mechanism according to claim 4, wherein the second driving pulley is identical with the first driving pulley.

* * * * *